United States Patent
Huss et al.

(10) Patent No.: US 7,269,361 B2
(45) Date of Patent: Sep. 11, 2007

(54) SYSTEM AND METHOD FOR NOTIFYING A USER OF A DOCUMENT LEFT AT A XEROGRAPHIC APPARATUS

(75) Inventors: Timothy L. Huss, Ontario, NY (US); Paul M. Wegman, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 209 days.

(21) Appl. No.: 11/201,357

(22) Filed: Aug. 10, 2005

(65) Prior Publication Data

US 2007/0036558 A1   Feb. 15, 2007

(51) Int. Cl.
*G03G 15/00* (2006.01)
(52) U.S. Cl. .............................................. 399/8; 399/16
(58) Field of Classification Search .................... 399/8, 399/16, 9
See application file for complete search history.

(56) References Cited

U.S. PATENT DOCUMENTS

| | | |
|---|---|---|
| 6,317,848 B1 | 11/2001 | Sorens et al. |
| 6,473,812 B2 | 10/2002 | Motoyama |
| 2003/0172115 A1 | 9/2003 | Motoyama |
| 2006/0171726 A1* | 8/2006 | Noda et al. ................... 399/16 |

FOREIGN PATENT DOCUMENTS

| | | | |
|---|---|---|---|
| EP | 0 633 510 B1 | | 3/1999 |
| JP | 61235865 A | * | 10/1986 |
| JP | 2002321429 A | * | 11/2002 |

* cited by examiner

*Primary Examiner*—Susan Lee
(74) *Attorney, Agent, or Firm*—Carter DeLuca Farrell & Schmidt LLP

(57) ABSTRACT

A system and method are provided for notifying a user of a document left at a xerographic apparatus, such as a printer or copier. The system includes a sensor module for sensing the document and determining whether the user is within a predetermined distance of the xerographic apparatus. The system further includes a notification module for notifying the user of the document left if the copier user is outside the predetermined distance of the copier. The system and method can utilize RFID transponders each worn by a respective copier user or input data for determining the identity of the user. Notification can be accomplished by one of several methods, such as transmitting an electronic message to the user, actuating an alarm located near or at the xerographic apparatus, and preventing further use of the apparatus until the document is retrieved.

20 Claims, 2 Drawing Sheets

| Copier ID | User Name | RFID No. | Email Address | Login Password | Login ID |
|---|---|---|---|---|---|
| Blue | John Skyseer | 6570 | johns@xerox.com | 41254 | 2034 |
| Blue | Paul Smith | 6571 | pauls@xerox.com | 51352 | 2035 |
| Blue | Albert Jones | 6572 | albertj@xerox.com | 37546 | 2036 |
| Blue | Gail Collins | 6573 | gailc@xerox.com | 89756 | 2037 |
| Blue | Maria Davids | 6574 | mariad@xerox.com | 23567 | 2038 |
| Red | John Skyseer | 6570 | johns@xerox.com | 41254 | 2034 |
| Red | Paul Smith | 6571 | pauls@xerox.com | 51352 | 2035 |
| Red | Albert Jones | 6572 | albertj@xerox.com | 37546 | 2036 |
| Red | Gail Collins | 6573 | gailc@xerox.com | 89756 | 2037 |
| Red | Maria Davids | 6574 | mariad@xerox.com | 23567 | 2038 |

*FIG. 2*

From: Blue Copier Administration     Sent: Wed 7/6/05  3:17 PM

To: johns@xerox.com cc:

Subject: Document Left At Blue Copier

You left a document at the Blue Copier at 3:15 PM. Please retrieve the document.

*FIG. 3*

SYSTEM AND METHOD FOR NOTIFYING A USER OF A DOCUMENT LEFT AT A XEROGRAPHIC APPARATUS

BACKGROUND

The present disclosure relates to xerographic apparatuses, more specifically, to system and method for notifying a user of a document left at a xerographic apparatus, such as a xerographic printer or copier.

Frequently, users of a xerographic apparatus, such as a xerographic printer or copier, leave documents at the copier after finishing a job, such as copying original documents, faxing documents, scanning documents, etc. The documents left behind, if not picked up, may pose a corporate, military, or personal security risk, depending on the documents' contents, if the documents are picked up by subsequent users of the xerographic apparatus.

Therefore, there is a need for a document notification system and method which detects documents left at a xerographic apparatus and provides notification to a user of the xerographic apparatus of the documents left behind.

SUMMARY

According to the present disclosure, a document notification system and method are provided for detecting documents left at a xerographic apparatus (hereinafter referred to as "copier") and providing notification to a user of the apparatus of the documents left behind. The system and method sense whether the copier user is in proximity to the copier and whether a document is left at the copier, either on the platen glass, return tray, or both. If it is determined that the copier user is not in proximity to the copier (i.e., the user is not within a predetermined distance of the copier) for a predetermined period of time and a document is left at the copier, the copier user is notified of the document left behind.

The notification is accomplished via one or more methods, such as transmitting an electronic message to the copier user, actuating an alarm located near or at the copier, preventing further use of the copier until the document left behind is retrieved, etc. The system and method determine if the copier user is not within the predetermined distance of the copier using conventional location technologies.

In particular, according to the present disclosure, a document notification system is integrated in a copier and includes a sensor module for sensing the document left behind and for determining whether the user is within a predetermined distance of the copier. The system further includes a notification module for notifying the user of the document left behind if the user is not within the predetermined distance of the copier. The notification module can notify the user if the user is not within the predetermined distance of the copier for a predetermined period of time.

The method according to the present disclosure includes sensing a document left behind at a copier, determining whether the copier user is within a predetermined distance of the copier, and notifying the copier user of the document left behind if it is determined that the copier user is not within the predetermined distance of the copier. Notification can be provided if the user is not within the predetermined distance of the copier for a predetermined period of time.

BRIEF DESCRIPTION OF THE DRAWINGS

Various embodiments of the present disclosure will be described herein below with reference to the figures wherein:

FIG. 2 is a schematic block diagram of a database storing user identification information for enabling the transmission of electronic notification messages to copier users according to the present disclosure; and FIG. 3 shows an exemplary electronic notification message according to the present disclosure.

DETAILED DESCRIPTION OF THE PREFERRED EMBODIMENTS

Figure 1:
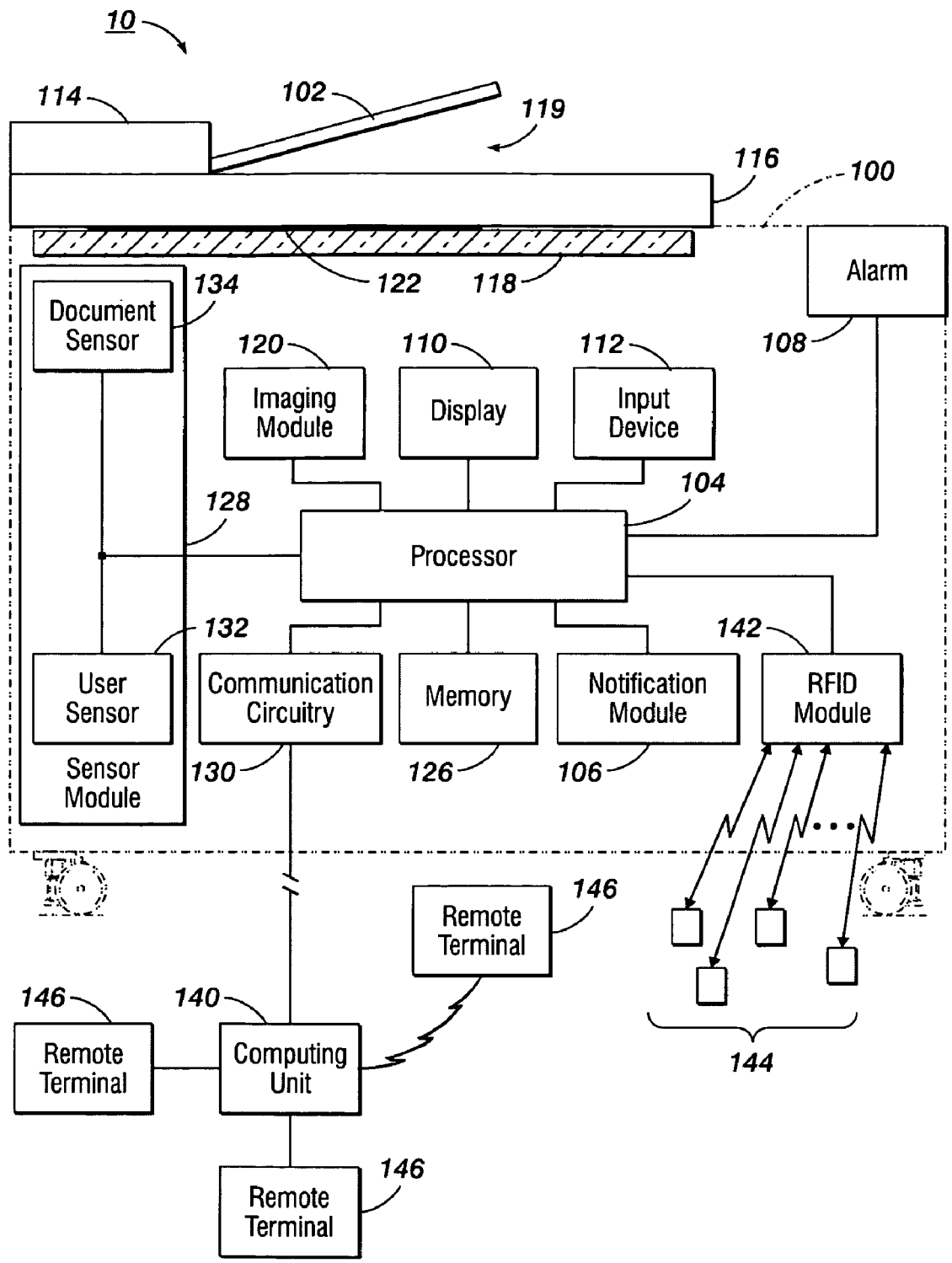
FIG. 1 is a schematic block diagram of a copier having a document notification system integrated therein according to the present disclosure.

Preferred embodiments of the present disclosure will be described herein below with reference to the accompanying drawings. In the following description, well-known functions or constructions are not described in detail to avoid obscuring the present disclosure in unnecessary detail.

The system and method of the present disclosure determine whether a user of a xerographic printing apparatus, such as a xerographic printer or copier (hereinafter collectively referred to as "copier"), is in proximity to the copier and whether a document is left at the copier. If it is determined that the copier user is not in proximity to the copier (i.e., the user is not within a predetermined distance of the copier) for a predetermined period of time and a document is left at the copier, the copier user is notified of the document left at the copier.

The notification is accomplished by one or more methods, such as by transmitting an electronic message to the copier user, and by preventing further use of the copier until the document is retrieved. An alarm located near or at the copier can also be actuated to notify the user of the document left within the copier. The system and method determine if the copier user is not within the predetermined distance of the copier using conventional location technologies, such as sensors and RFID transponders as further described below.

With reference to FIG. 1, a document notification system 10 according to the present disclosure is shown. The system 10 is integrated within a copier 100 having a variety of document production functionalities, such as for example, photocopying, scanning, printing and faxing functionalities. The copier 100 further includes a processor 104 for running an operating system and/or other software for performing the document production functionalities and other functions in accordance with the present disclosure, such as transmitting an email notification message to a copier user regarding a document left at the copier 100.

The processor 104 is connected to memory 126 which is used for storing software and images of processed documents (e.g., images acquired during scanning, printing, copying, etc.). The memory 126 also stores other data, such as user data, which may be utilized to limit access to the copier 100. In this sense, the copier 100 may require a copier user to input a user identification (user ID or log-in ID) along with a corresponding password (log-in password) to authenticate the copier user prior to enabling the user to use the document production functionalities.

The user data may be stored in a database 150 as shown in FIG. 2 and discussed in more detail below. The user data allow the copier 100 to control access to its production functionalities as well as to accumulate and store usage data related to each user (e.g., number of copies made by each user, time of day copier was used by each user, etc.).

The copier 100 further includes a display 110 for displaying a user interface which is configured to control the document production processes and an input device 112 (e.g., a keypad, a touch screen incorporated with the display 110) for transmitting commands to the processor 104 via the user interface.

The processor 104 also controls other components of the copier 100, such as an imager 118 which is located underneath a platen glass. The copier 100 also includes a cover 116 having a feeder 114 which automatically feeds one or more documents 122 held by a feeder tray 102 over the platen glass. The feeder 114 includes feeding means (e.g., guide rollers) which move the documents 118 from the feeder tray 102 and places the documents 118 over the platen glass and over the imager 118 whereupon the documents 118 are scanned and extracted to a return tray 119. The imager 118 is controlled by an imaging module 120 which acquires and processes images of the documents 118.

A sensor module 128 senses whether the document 122 has been left within the copier 100 and whether the copier user is not within a predetermined distance of the copier 100. To perform these function, the sensor module 128 includes a document sensor 134, such as an infrared sensor, laser sensor, etc., which senses whether the document(s) 122 has been left within the copier 100, e.g., on the platen glass and/or the return tray 119, and a user sensor 132, such as a proximity sensor having an infrared or laser module, which determines if the copier user is not within the predetermined distance of the copier 100. The document sensor 134 can include a document detection device as described in EP 0 633 510 B1, the entire contents of which are incorporated herein by reference. An RFID module 142 is also provided for determining if the copier user is within the predetermined distance as further described below.

The user sensor 132 determines if the user is not within the predetermined distance for a predetermined period of time (e.g., greater than 30 seconds) before communicating to the processor 104 to notify the copier user in accordance with the present disclosure to reduce the number of "false" alarms and/or electronic message notifications (e.g., wherein the user intentionally leaves a document within the copier 100 or return tray 119 temporarily). The user sensor 132 includes a timer for clocking the predetermined period of time. Time calculations can also be carried out by an internal clock of the processor 104, BIOS clock, clock software, etc. in operative communication with the user sensor 132.

If the document sensor 134 senses that the document 122 is within the copier 100 and the user sensor 132 senses that the user is not within the predetermined distance for a predetermined period of time, then the sensor module 128 transmits a signal to the processor 104. Upon receiving the signal, the processor 104 executes a series of programmable instructions stored in a notification module 106 for transmitting the electronic notification message to notify the user of the document 122 left behind.

Notification can be accomplished by one or more other methods, such as the processor 104 actuating an alarm 108, such as an audio and/or visual alarm (e.g., light bulb, light emitting device, etc.), disposed at the copier 100 and/or in proximity to the copier 100, the processor 104 signaling the notification module to transmit an electronic notification message, and/or the display 110 displaying a text message, such as "Remove originals from glass." The alarm 108 can be a component of the document notification system 10 or a component of the copier 100.

Notification can also be accomplished by having the processor 104 lock the copier 100 for preventing further use of the copier 100 until the copier user who left the document 122 at the copier 100 enters his user identification code and/or password to unlock the copier 100 and retrieve the document 122 from the platen glass and/or return tray 119.

The electronic notification message (e.g., a text message, a telephone message, a page message, an email message, etc.) is transmitted to a computing unit 140 for routing to a remote terminal 146 corresponding to the copier user as further described below. The electronic notification message notifies the user of the document 122 left at the copier 100. It is envisioned that the electronic notification message is transmitted from the copier 100 directly to the remote terminal 146 corresponding to the copier user.

The processor 104 determines to which remote terminal 146 the electronic notification message is to be transmitted to by using user log-in information and/or read RFID data. If the copier user logged-in before using the document production functionalities of the copier 100 by inputting a user identification code and/or a password, the processor 104 uses this data to identify and/or authenticate the copier user as known in the art. In accordance with the present disclosure, this information is also used to determine who left the document 122 at the copier 100 for notifying the proper copier user as further described below with reference to database 150 shown by FIG. 2.

The database 150 stores user identification data and other user-related data, such as user identity and user contact information (e.g., email addresses, telephone numbers, pager numbers, etc.). The database 150 shows exemplary information identifying one or more users. The identifying information includes a copier identification code 151, the user name 152, RFID number 154, email address 156, log-in password 158 and log-in ID 159.

It is envisioned for the database 150 to include additional columns each corresponding to one of the document production functionalities of the copier 100, where each column indicates whether a particular copier user can use the specific document production functionality identified by that column. For example, one copier user can be allowed to use the scanning function of the copier 100 and not be allowed to use the faxing function of the copier 100, while another copier user is not allowed to use the scanning function of the copier 100 and is allowed to use the faxing function of the copier 100.

The information stored within the database 150 enables the processor 104 to match the inputted user identification code (log-in ID 159) and/or password (log-in password 158) with the user name 152 to identify and/or authenticate the copier user and determine whether the identified copier user can use the one or more copiers' document production functionalities.

More specifically, with reference to FIG. 2, a copier user named John Skyseer wants to use one of two copiers 100 on the premises which correspond to the identification codes "Blue" and "Red." In particular, he wants to use the copier 100 having the copier ID "Blue". Accordingly, John Skyseer logs-in to copier Blue using his copier log-in ID 2034 and/or log-in password 41254, the processor 104 of copier Blue matches the log-in ID 2034 and/or log-in password 41254 with the user name John Skyseer and identifies the copier user as being John Skyseer. The processor 104 then enables John Skyseer to use the document production functionalities of the copier 100.

Using the database 150, the processor 104 further determines the user's email address is johns@xerox.com by cross-referencing the log-in ID 2034, log-in password 41254 and/or user name with the corresponding email address 156. Hence, if John Skyseer is determined by the user sensor module 132 to be outside the predetermined distance of the copier Blue for a predetermined period of time, the processor 104 already has the user's contact information (e.g., the user's email address or johns@xerox.com) and thereby, signals the notification module 106 to compose an electronic notification message 160, such as an email message as shown in FIG. 3, which is subsequently transmitted via the communication circuitry 130 to the user notifying him of the document 122 left within the copier 100 and/or on the return tray 119. The communication circuitry 130 can be part of the document notification system 10 or part of the copier 100 as shown by FIG. 1.

The electronic notification message 160 composed by the notification module 106 includes a date and time the document 122 was left at the copier 100, and the information identifying the copier 100 at which the document 122 was left. This information quickly informs the copier user of the document left at the copier 100 and facilitates quick retrieval thereof. The current date and time are determined by the notification module by accessing an internal clock/date module of the copier 100 and thereafter appending to the electronic notification message 160 with the proper date and time.

The electronic notification message 160 includes the same message every time it is transmitted to one of the copier users other than having a different date and time in the header 162 and different time in the body 164, and of course, a different email address if being transmitted to a different copier user. It is envisioned, however, for programming the notification module 106 to transmit electronic notification messages which provide additional text when a copier user has left a document 122 at a copier 100 more than a predetermined number of times in a given time period. Such an electronic notification message can read, "You left a document at the Blue Copier at 3:15 PM. Please retrieve the document. This is the fourth time this week you left a document at a copier, please be mindful as to the sensitivity of the documents you are entrusted with."

It is envisioned that the processor 104 can be programmed to prevent usage of the copier 100 by copier users who are flagged to have left documents at the copier 100 more than a predetermined number of times in a given time period, such as more than five times within one month. To this end, the copier's display 110 can display a message such as "Access to this copier is denied. Please see your administrator," after the copier user inputs his log-in password 158, log-in ID 159 and/or the RFID module 142 "senses" the copier user being within a predetermined distance of the copier 100.

A more detailed description will now be provided as to the operation of the RFID module 142. The RFID module 142 is in operative communication with the processor 104 and is an RFID interrogator having a limited scanning range (e.g., preferably the same range as the range of the user sensor 132) for interrogating a plurality of RFID transponders 144 each individually worn by a respective copier user. Each RFID transponder 144 transmits information, such as an RFID number 154, which can be used by the copier 100 for identifying the copier user wearing the RFID transponder 144. The RFID transponders 144 can be affixed to name tags, security tags, etc. worn by copier users in a facility, such as an office building, educational institution, medical facility, etc.

In operation, when the user is within the range of the RFID module 142 or within the predetermined distance from the copier 100, the transmitted RFID number 154 is obtained or read by the RFID module 142 and transmitted to the processor 104. The processor 104 determines the identity of the user by looking-up the read RFID number 154 in the database 150 and cross-referencing the looked-up RFID number 154 with the user name 152.

The processor 104 waits for the copier user to input his log-in password 158 and/or ID 159 before enabling the user to use the document production functionalities of the copier 100. If the inputted password 158 and/or ID 159 does not match the read RFID number 154, a message can be displayed by the display 110 indicating that the inputted password 158 and/or ID 159 does not match the read RFID number 154. The copier user is prevented from using the document production functionalities until he inputs a password 158 and/or ID 159 which matches the most recently read RFID number 154. In this sense, the RFID module 142 is continuously active to detect and read RFID signals being transmitted by RFID transponders 144 located within the predetermined distance of the copier 100.

Alternatively, the RFID module 142 is in operative communication with the sensor module 128 for being activated by the sensor module 128 when the sensor module 128 detects a copier user within the predetermined distance of the copier 100. After the RFID module 142 is activated by receiving a signal from the sensor module 128 via the processor 104, the RFID module 142 reads the information transmitted from the RFID transponder 144 worn by the copier user within the predetermined distance of the copier 100.

In situations where the copier 100 can be used without being pre-programmed for receiving a log-in password 158 and/or log-in ID 159, the RFID module 142 enables the processor 104 to distinguish between who is actually using the copier 100 from one or more copier users who are not using the copier at that time but are within the predetermined distance of the copier 100. By executing signal analysis software, the processor 104 is able to determine which RFID signal has the greatest strength.

The RFID signal received from the RFID transponder 144 corresponding to the copier user who is actually using the copier 100 will have the greatest strength, since that copier user's RFID transponder 144 is the closest to the RFID module 142 of the copier 100. The processor 104 is then able to identify the actual copier user by accessing the database 150 and looking-up the RFID number 154 corresponding to the RFID signal having the greatest strength and cross-referencing that RFID number 154 to the user name 152.

This methodology enables the processor 104 to identify the actual copier user from among one or more individuals who are within the predetermined distance of the copier 100 and who are wearing RFID transponders 144. This is particularly useful in situations where a copier user is operating the copier 100 and one or more individuals wearing RFID transponders 144 come within the predetermined distance of the copier 100. If the actual user leaves a document 122 within the copier 100 and/or on the return tray 119 of the copier 100, the processor 104 knows which copier user left the document 122. The processor 104 then signals the notification module 106 to compose the electronic notification message which is subsequently transmitted by the processor 104 via the communication circuitry 130 to the remote terminal 146 corresponding to the copier user who left the document 122. The processor 104 can also actuate the alarm 108 to notify the copier user of the document 122 left behind as described above.

The communication circuitry 130 include components for performing wireless and non-wireless communications for transmitting and receiving data, such as transmitting electronic notification messages to remote terminals 146 each corresponding to a respective copier user in accordance with the present disclosure, as well as receiving software updates from other computing units, including the remote terminals 146.

The communication circuitry 130 is configured to communicate with the computing unit 140 using specific communication standards and/or protocols, such as TCP/IP, IEEE 802.11, Bluetooth™, etc., over a network or non-network connection. The communication circuitry 130 can also transmit to the computing unit 140 copier usage data and other data, such as fault information relating to copier downtime and fault conditions, and number of pages copied, scanned, faxed, etc.

The remote terminals 146 can include cellular phones, pagers, personal digital assistants, personal computers, or other devices capable of receiving electronic notification messages. It is to be understood that the present disclosure may be implemented in various forms of hardware, software, firmware, special purpose processors, or a combination thereof. The computing unit 140 and remote terminals 146 may include one or more central processing units, memories, such random access memory, read only memory, etc., input/output devices, such as a keyboard, cursor control device, display, etc., and data storage devices, such as a hard drive, a CD-ROM drive, a DVD drive, etc.

The computing unit 140 and remote terminals 146 also include an operating system and/or other software, such as software configured to process and display the electronic notification message as shown by FIG. 3, such as for example, email software. The various processes and functions described herein may either be part of micro instruction code, firmware, and/or part of the application program (or a combination thereof) which are executed via the processor 104, a processor of the computing unit 140, and/or a processor of the remote terminals 146. The functions in accordance with the present disclosure can also be performed by one or more ASICs provided within the copier 100, the computing unit 140 and/or the remote terminals 146.

It is envisioned that the principles of the present disclosure can be used for detecting whether documents have been left at other apparatuses and machines, such as a facsimile apparatus, a sorting machine, a collation machine, a postage machine, etc., for notifying users of these apparatuses and machines.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A document notification system for a xerographic apparatus, said system comprising:
   a sensor module comprising:
      a document sensor for detecting a document left at said xerographic apparatus by a user of said xerographic apparatus; and
      a user sensor for determining whether said user is within a predetermined distance of said xerographic apparatus, and transmitting a signal to at least one processor if said document sensor detects said document and said user sensor determines said user is not within said predetermined distance of said xerographic apparatus; and
   a notification module storing a series of programmable instructions capable of being executed by said at least one processor upon receiving said signal for notifying said user of said document left at said xerographic apparatus.

2. The system according to claim 1, wherein said document notification system is integrated with said xerographic apparatus.

3. The system according to claim 1, further comprising an alarm configured to notify the user of the document left at said xerographic apparatus when the user is outside the predetermined distance.

4. The system according to claim 3, wherein the alarm is at least one of an audio and a visual alarm.

5. The system according to claim 1, further comprising communication circuitry, wherein the notification module generates at least one message for transmission to said user via said communication circuitry for notifying said user of said document left at said xerographic apparatus.

6. The system according to claim 5, wherein said at least one message is selected from the group consisting of a text message, a telephone message, a page message, and an email message.

7. The system according to claim 1, further comprising a plurality of RFID transponders in operative communication with an RFID module for transmitting user identification data to said RFID module, said RFID module transmitting said user identification data to said at least one processor for determining the identity of said user.

8. The system according to claim 1, further comprising a database storing data related to a plurality of users of said xerographic apparatus, including said user, and accessible by said at least one processor for determining the identity of said user using input data.

9. The system according to claim 1, wherein said user sensor transmits said signal to said at least one processor if said user is not within said predetermined distance of said xerographic apparatus for a predetermined period of time.

10. The system according to claim 1, wherein said xerographic apparatus includes a display in operative communication with said processor, said display displaying a message notifying said user of said document.

11. A method for notifying a user of a document left at a xerographic apparatus, said method comprising:
   detecting said document left at said xerographic apparatus by said user of said xerographic apparatus;
   determining whether said user is within a predetermined distance of said xerographic apparatus; and
   notifying said user of said document left at said xerographic apparatus if said user is not within said predetermined distance of said xerographic apparatus.

12. The method according to claim 11, wherein the step of notifying includes preventing further use of said xerographic apparatus if said user is not within said predetermined distance of said xerographic apparatus.

13. The method according to claim 11, wherein the step of notifying includes actuating an alarm.

14. The method according to claim 11, wherein the step of notifying includes generating at least one message and transmitting said at least one message to said user.

15. The method according to claim 14, wherein said at least one message is selected from the group consisting of a text message, a telephone message, a page message, and an email message.

16. The method according to claim 11, wherein the step of notifying includes notifying said user if said user is not within said predetermined distance of said xerographic apparatus for a predetermined period of time.

17. The method according to claim 11, wherein the step of notifying includes displaying a message notifying said user of said document.

18. The method according to claim 11, further comprising providing a plurality of RFID transponders in operative communication with an RFID module for transmitting user identification data to said RFID module and determining the identity of said user using said user identification data.

19. The method according to claim 18, further comprising analyzing signals received from at least two RFID transponders of said plurality of transponders for determining which RFID transponder is closest to said RFID module.

20. The method according to claim 11, further comprising providing a database storing data related to a plurality of users of said xerographic apparatus, including said user, and accessing said database for determining the identity of said user using input data.

* * * * *